US009864407B2

(12) United States Patent
Zhao et al.

(10) Patent No.: US 9,864,407 B2
(45) Date of Patent: Jan. 9, 2018

(54) MOBILE COMPUTING DEVICE DOCK

(71) Applicant: MICROSOFT TECHNOLOGY LICENSING, LLC, Redmond, WA (US)

(72) Inventors: Kelong Zhao, Shenzhen (CN); Min Li Tee, Shenzhen (CN); Xian Ming Huang, Shenzhen (CN); Flen Ju, Shenzhen (CN); Wei Zheng, Shenzhen (CN); Jian Zhong Wang, Shenzhen (CN); Mingjie Wang, Shenzhen (CN); Ralf Groene, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 415 days.

(21) Appl. No.: 14/130,405

(22) PCT Filed: Sep. 22, 2013

(86) PCT No.: PCT/CN2013/083892
§ 371 (c)(1),
(2) Date: Dec. 31, 2013

(87) PCT Pub. No.: WO2015/039329
PCT Pub. Date: Mar. 26, 2015

(65) Prior Publication Data
US 2015/0220113 A1    Aug. 6, 2015

(51) Int. Cl.
*G06F 13/38* (2006.01)
*G06F 1/16* (2006.01)
*G06F 13/42* (2006.01)

(52) U.S. Cl.
CPC .......... *G06F 1/1632* (2013.01); *G06F 1/1626* (2013.01); *G06F 13/4221* (2013.01)

(58) Field of Classification Search
None
See application file for complete search history.

(56) References Cited

U.S. PATENT DOCUMENTS 8,098,488 B2    1/2012    Lewandowski et al.
2004/0217992 A1 *  11/2004  Oskulak ................ G06F 1/1632
                                                                 345/30

(Continued)

FOREIGN PATENT DOCUMENTS

CN    101930253    12/2010
CN    102445956     5/2012

(Continued)

OTHER PUBLICATIONS

"International Search Report and Written Opinion", Application No. PCT/CN2013/083892, dated Jun. 30, 2014, 13 pages.

(Continued)

*Primary Examiner* — Ilwoo Park

(57) ABSTRACT

A mobile computing device dock is described. In one or more implementations, an apparatus includes a support structure and first and second connection portions disposed on opposing sides of the support. Each of the first and second connection portions includes a respective connection device configured to form a communicative coupling to a mobile computing device. The first and second connection portions are configured such that movement of one of the first or second connection portions causes corresponding movement of the other one of the first or second connection portions to engage to or disengage from the mobile computing device.

20 Claims, 12 Drawing Sheets

(56) References Cited

U.S. PATENT DOCUMENTS

| | | | |
|---|---|---|---|
| 2010/0318709 A1 | 12/2010 | Bell et al. | |
| 2011/0065314 A1 | 3/2011 | Vroom et al. | |
| 2012/0250246 A1 | 10/2012 | Nakajima | |
| 2013/0050932 A1 | 2/2013 | Williams | |
| 2013/0107445 A1 | 5/2013 | Reber et al. | |
| 2013/0148289 A1* | 6/2013 | Kwon | G06F 1/1632 361/679.43 |
| 2013/0201619 A1 | 8/2013 | Hung et al. | |
| 2013/0277520 A1* | 10/2013 | Funk | F16M 13/02 248/274.1 |
| 2015/0036275 A1* | 2/2015 | Doczy | G06F 1/1626 361/679.17 |

FOREIGN PATENT DOCUMENTS

| | | |
|---|---|---|
| CN | 102999102 | 3/2013 |
| WO | WO-2013056029 | 4/2013 |
| WO | WO-2013056107 | 4/2013 |

OTHER PUBLICATIONS

"Fujitsu Stylistic® ST4110 Series Tablet Dock User's Guide", Available at <http://www.fujitsu.com/downloads/COMP/fpcap/drivers/oldModel/uguide/winter02/tb_st4110.pdf>, (Oct. 2002), 10 Pages.

"Introducing USB 3.0 Docking Stands for Ultrabook & Win8 Tablets", Available at <http://www.belkinbusiness.com/sites/default/files/USB%203.0%20Ultrabook%20and%20Tabet%20Docks%20-%20PR%20Deck%20May%202013.pdf>, (May 2013), pp. 1-21.

"Tablet PC Docking Station, PC docking stations", Retrieved from: <http://www.quaduro.com/en/gb/news/docking-station-/-cradle-for-industrial-tablet-pc-computing/> 11/7/13, (Oct. 5, 2011), 1 page.

"Supplementary European Search Report", EP Application No. 13893879.0, dated Aug. 10, 2016, 4 pages.

"Foreign Office Action", EP Application No. 13893879.0, dated Aug. 25, 2016, 7 pages.

\* cited by examiner

1100

1102
Position a rear of a mobile computing device against a support of a docking apparatus such that a display device of the mobile computing device is viewable by a user

1104
Move a single one of a plurality of connection portions of the docking apparatus toward the mobile computing device, the moving causing another one of the plurality of connection portions to move toward the mobile computing device such that each of the plurality of connection portions engage the mobile computing device to form a communicative coupling

Fig. 11

MOBILE COMPUTING DEVICE DOCK

PRIORITY APPLICATION

This application claims priority under 35 U.S.C. 119(b) to PCT Application Serial No. PCT/CN2013/083892 filed Sep. 22, 2013, entitled "Mobile Computing Device Dock", the disclosure of which is incorporated by reference herein in its entirety.

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on. Because mobile computing devices are configured to be mobile, however, the devices may be ill suited for intensive data entry operations.

One technique that has been developed to aid in expanding the functionality of these devices to support such usage includes use of peripheral devices, such as external monitors, keyboards, and so on. Although docking stations have been developed to aid in the convenience of connecting these devices, conventional docking stations typically limited how interaction with the device was performed, were limited to particular types of computing devices such as laptop computers, and so forth.

SUMMARY

A mobile computing device dock is described. In one or more implementations, an apparatus includes a support structure and first and second connection portions disposed on opposing sides of the support. Each of the first and second connection portions includes a respective connection device configured to form a communicative coupling to a mobile computing device. The first and second connection portions are configured such that movement of one of the first or second connection portions causes corresponding movement of the other one of the first or second connection portions to engage to or disengage from the mobile computing device.

In one or more implementations, a system includes a mobile computing device configured to be held by one or more hands of a user and a docking apparatus having first and second connection portions configured to removably engage opposing sides of the mobile computing device. Each of the first and second connection portions includes a respective connection device configured to form a communicative coupling to the mobile computing device. The first and second connection portions are configured such that movement of one of the first or second connection portions causes corresponding movement of the other one of the first or second connection portions.

In one or more implementations, a rear of a mobile computing device is positioned against a support of a docking apparatus such that a display device of the mobile computing device is viewable by a user. A single one of a plurality of connection portions of the docking apparatus are moved toward the mobile computing device, the movement causing another one of the plurality of connection portions to move toward the mobile computing device such that each of the plurality of connection portions engage the mobile computing device to form a communicative coupling This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 11 depicts an example procedure in which a mobile computing device is physically and communicatively coupled to a housing apparatus.

DETAILED DESCRIPTION

Overview

To make mobile computing devices suitable for mobile usage, the mobile computing devices are typically constructed to be held by one or more hands of a user. Examples of such mobile computing devices include tablet computers, mobile phones, mobile game devices, portable music players, and so on. However, such configurations ate typically ill-suited for intensive data entry scenarios. Although techniques have been developed to aid in this interaction, such as to utilize a dock to support connection to peripheral devices, conventional configurations of such docks were generally limited to laptop computers and limited input scenarios that were available to a user.

A mobile computing device dock is described. In one or more implementations, an apparatus is configured as a mobile computing device dock that is configured to support a connection between one or more peripheral devices and a power supply with a mobile computing device, such as a tablet computer, mobile phone (e.g., a smartphone), and so forth as described above. This configuration may support a variety of functionality. For example, the configuration may be configured to support connections to ports disposed on opposing sides of a mobile computing device, such as communication ports, a connection to a power supply, and so forth. The apparatus, for instance, may include first and second connection portions that are configured to engage the opposing sides of the mobile computing device and more particularly ports disposed on those side. This may be performed through linked movement of the connection portions such that movement of one of the connection portions causes corresponding movement of the other connection portion, e.g., slidable movement, rotations, and so forth. Further, this movement may include mechanisms to assist with an insertion and extraction force involved in engaging to and disengaging from the mobile computing device.

Additionally, the apparatus may be configured to support interaction with the mobile computing device when "docked," such as to access touchscreen functionality of a display device of the mobile computing device, access to an input device that is also attached to the mobile computing device (e.g., a cover having an integrated keyboard and track pad), and so on. Thus, the apparatus may be configured to support a wide variety of different types of functionality, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
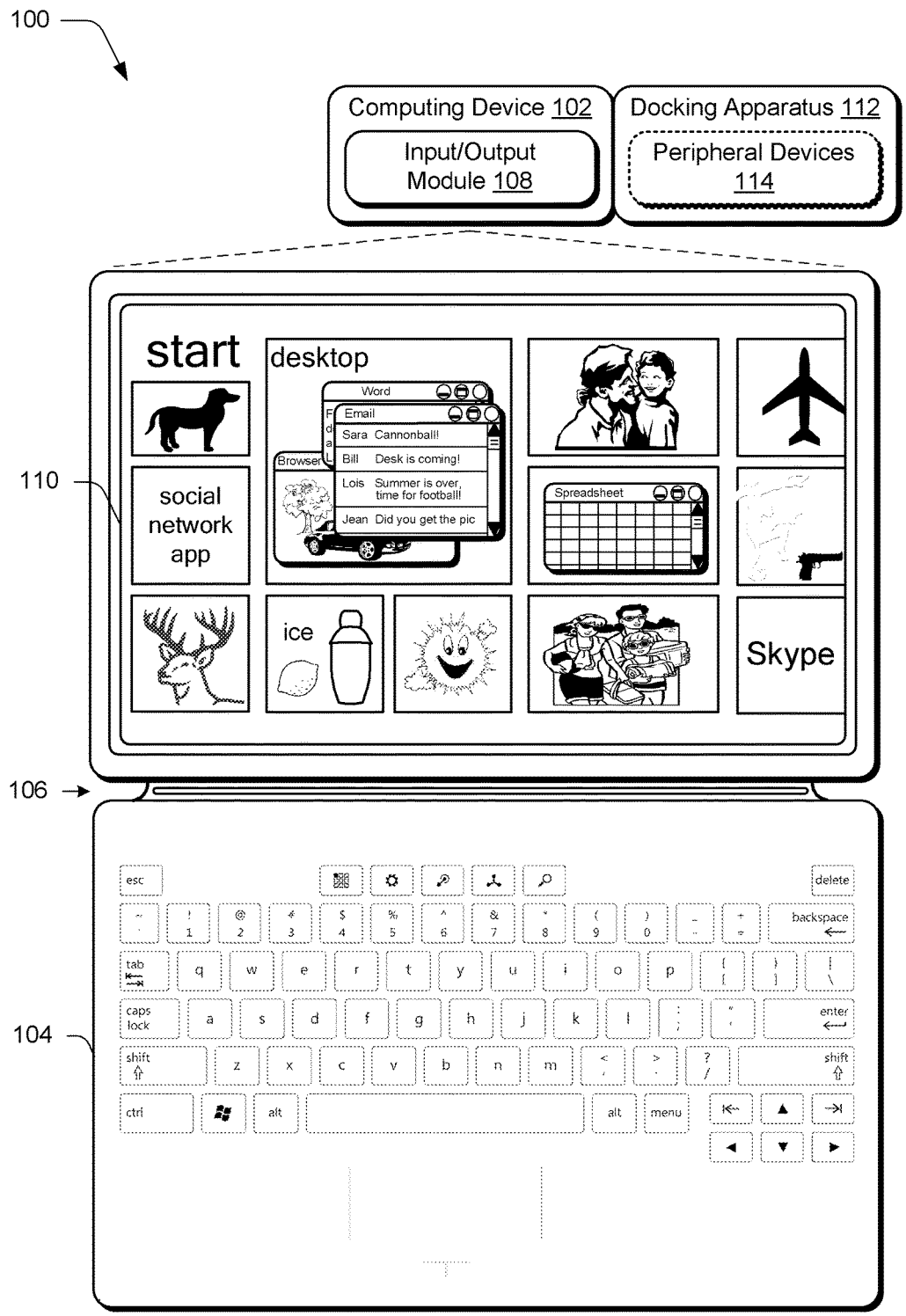
FIG. 1 is an illustration of an environment in an example implementation that is operable to employ the techniques described herein.

FIG. 1 is an illustration of an environment 100 in an example implementation that is operable to employ the techniques described herein. The illustrated environment 100 includes an example of a computing device 102 that is physically and communicatively coupled to an input device 104 via a flexible hinge 106. The computing device 102 may be configured in a variety of ways. For example, the computing device 102 may be configured for mobile use, such as a mobile phone, a tablet computer as illustrated, and so on that is configured to be held by one or more hands of a user. Thus, the computing device 102 may range from full resource devices with substantial memory and processor resources to a low-resource device with limited memory and/or processing resources. The computing device 102 may also relate to software that causes the computing device 102 to perform one or more operations.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the input device 104, keys of a virtual keyboard displayed by the display device 110 to identify gestures and cause operations to be performed that correspond to the gestures that may be recognized through the input device 104 and/or touchscreen functionality of the display device 110, and so forth. Thus, the input/output module 108 may support a variety of different input techniques by recognizing and leveraging a division between types of inputs including key presses, gestures, and so on.

In the illustrated example, the input device 104 is configured as having an input portion that includes a keyboard having a QWERTY arrangement of keys and track pad although other arrangements of keys are also contemplated. Further, other non-conventional configurations are also contemplated, such as a game controller, configuration to mimic a musical instrument, and so forth. Thus, the input device 104 and keys incorporated by the input device 104 may assume a variety of different configurations to support a variety of different functionality.

As previously described, the input device 104 is physically and communicatively coupled to the computing device 102 in this example through use of a flexible hinge 106. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one or more directions (e.g., vertically in the figure) yet restrict movement in other directions, such as lateral movement of the input device 104 in relation to the computing device 102. This may be used to support consistent alignment of the input device 104 in relation to the computing device 102, such as to align sensors used to change power states, application states, and so on.

The flexible hinge 106, for instance, may be formed using one or more layers of fabric and include conductors formed as flexible traces to communicatively couple the input device 104 to the computing device 102 and vice versa. This communication, for instance, may be used to communicate a result of a key press to the computing device 102, receive power from the computing device, perform authentication, provide supplemental power to the computing device 102, and so on.

The computing device 102 is also illustrated as employing a docking apparatus 112. The docking apparatus 112 is configured to support a communicative coupling to one or more peripheral devices 114, which are illustrated in phantom in the figure. The peripheral devices 114, for instance, may be configured in a variety of ways, such as an external monitor, external storage device, printer, external input device (e.g., keyboard, mouse, gesture capture device), external power supply, and so on. Thus, by physically and communicatively coupling the computing device 102 to the docking apparatus 112, the computing device may leverage functionality provided by the devices. Further discussion of the docking apparatus 112 may be found beginning in relation to the discussion of FIG. 4 which follows further discussion of an example of the input device 102 as follows.

Figure 2:
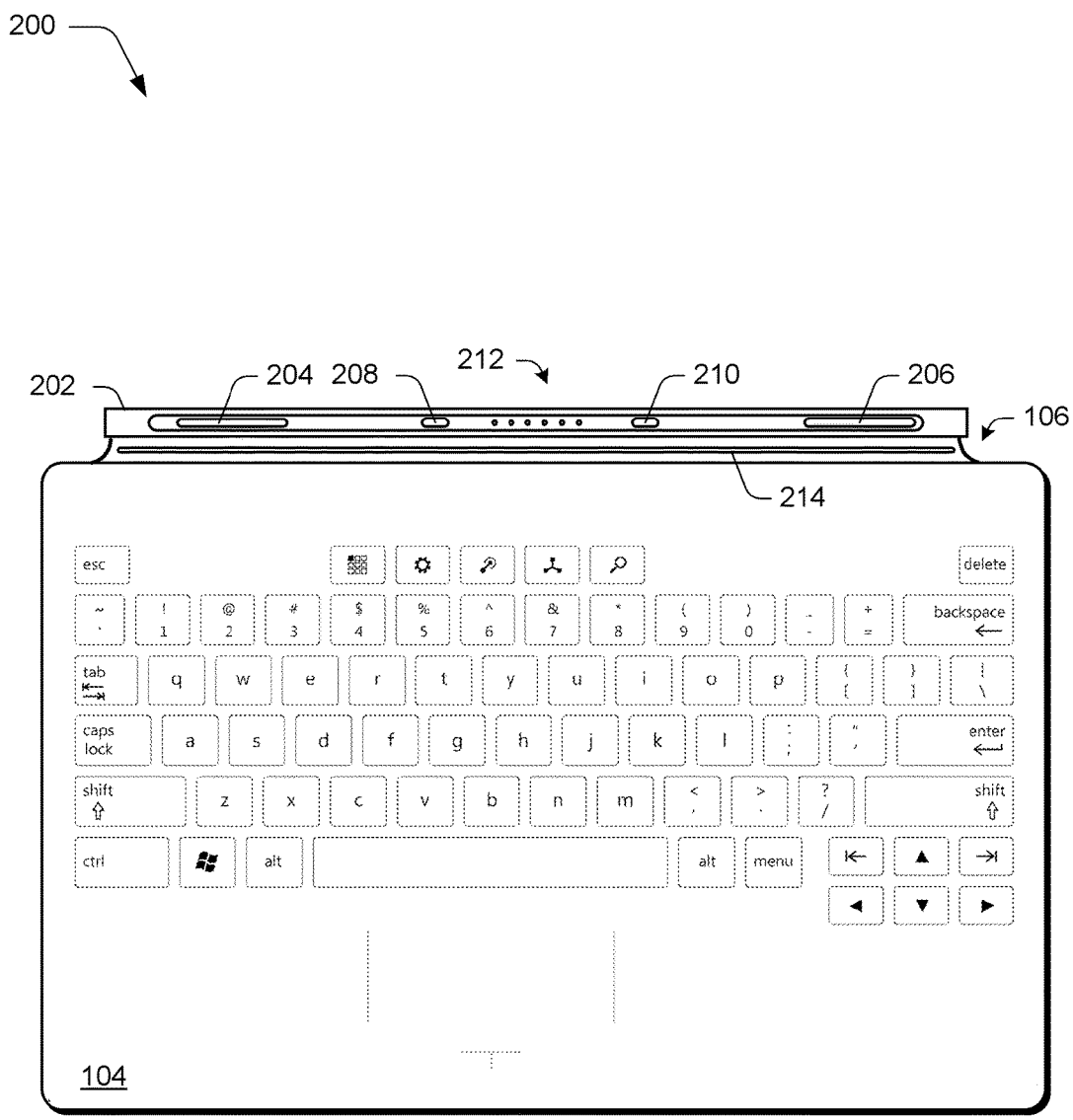
FIG. 2 depicts an example implementation of an input device of FIG. 1 as showing a flexible hinge in greater detail.

FIG. 2 depicts an example implementation 200 of the input device 104 of FIG. 1 as showing the flexible hinge 106 in greater detail. In this example, a connection portion 202 of the input device is shown that is configured to provide a communicative and physical connection between the input device 104 and the computing device 102. The connection portion 202 as illustrated has a height and cross section configured to be received in a channel in the housing of the computing device 102, although this arrangement may also be reversed without departing from the spirit and scope thereof.

The connection portion 202 is flexibly connected to a portion of the input device 104 that includes the keys through use of the flexible hinge 106. Thus, when the connection portion 202 is physically connected to the computing device the combination of the connection portion 202 and the flexible hinge 106 supports movement of the input device 104 in relation to the computing device 102 that is similar to a hinge of a book.

Through this rotational movement, a variety of different orientations of the input device 104 in relation to the computing device 102 may be supported. For example, rotational movement may be supported by the flexible hinge 106 such that the input device 104 may be placed against the display device 110 of the computing device 102 and thereby act as a cover. Thus, the input device 104 may act to protect the display device 110 of the computing device 102 from harm.

The connection portion 202 may be secured to the computing device in a variety of ways, an example of which is illustrated as including magnetic coupling devices 204, 206, mechanical coupling protrusions 208, 210, and a plurality of communication contacts 212. The magnetic coupling devices 204, 206 are configured to magnetically couple to complementary magnetic coupling devices of the computing device 102 through use of one or more magnets. In this way, the input device 104 may be physically secured to the computing device 102 through use of magnetic attraction.

The connection portion 202 also includes mechanical coupling protrusions 208, 210 to form a mechanical physical connection between the input device 104 and the computing device 102. The mechanical coupling protrusions 208, 210 are shown in greater detail in relation to FIG. 3, which is discussed below.

Figure 3:
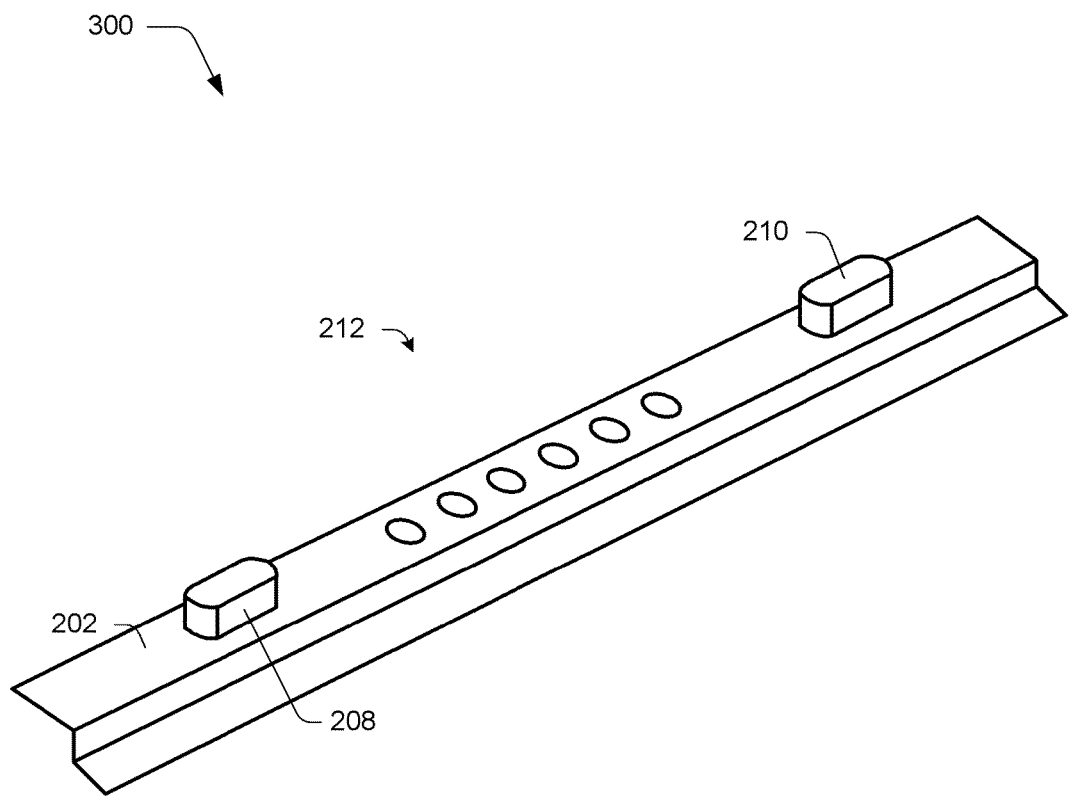
FIG. 3 depicts an example implementation showing a perspective view of a connection portion of FIG. 2 that includes mechanical coupling protrusions and a plurality of communication contacts.

FIG. 3 depicts an example implementation 300 showing a perspective view of the connection portion 202 of FIG. 2 that includes the mechanical coupling protrusions 208, 210 and the plurality of communication contacts 212. As illustrated, the mechanical coupling protrusions 208, 210 are configured to extend away from a surface of the connection portion 202, which in this case is perpendicular although other angles are also contemplated.

The mechanical coupling protrusions 208, 210 are configured to be received within complimentary cavities within the channel of the computing device 102. When so received, the mechanical coupling protrusions 208, 210 promote a mechanical binding between the devices when forces are applied that are not aligned with an axis that is defined as correspond to the height of the protrusions and the depth of the cavity.

The connection portion 202 is also illustrated as including a plurality of communication contacts 212. The plurality of communication contacts 212 is configured to contact corresponding communication contacts of the computing device 102 to form a communicative coupling between the devices as shown. The connection portion 202 may be configured in a variety of other ways, including use of a rotational hinge, mechanical securing device, and so on. In the following, an example of a docking apparatus 112 is described and shown in a corresponding figure.

Figure 4:
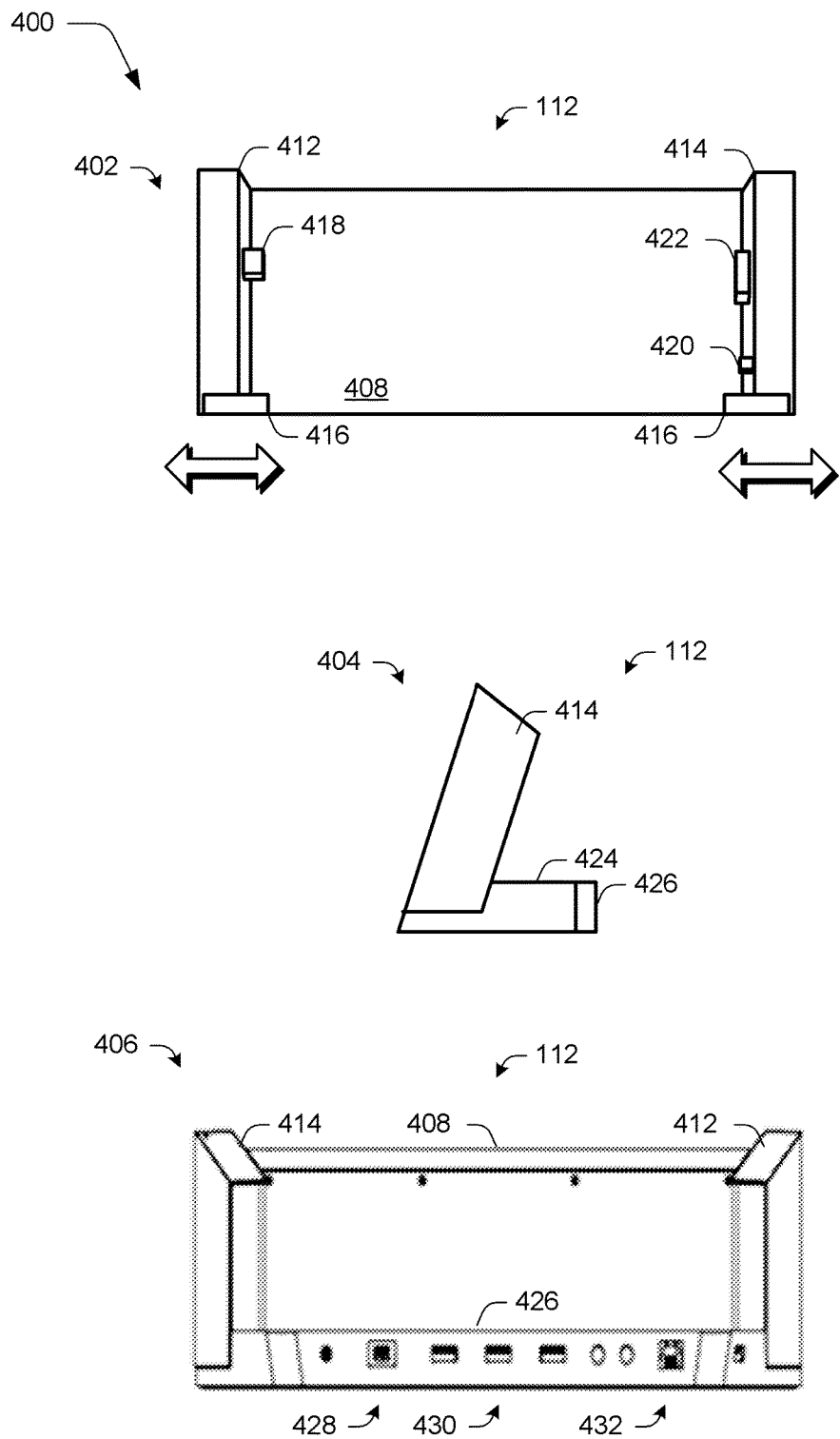
FIG. 4 depicts an example of a docking apparatus of FIG. 1 that is configured to support a connection between the computing device and one or more peripheral devices.

FIG. 4 depicts an example 400 of a docking apparatus 112 of FIG. 1 that is configured to support a connection between the computing device 102 and one or more peripheral devices 114. The docking apparatus 112 is illustrated in FIG. 4 through a front view 402, a side view 404, and a rear view 406.

In the front view 402, the docking apparatus 112 is illustrated as including a support structure 408, to which, first and second connection portions 412, 414 (e.g., wings) are movably attached, e.g., slidable, rotatable, and so on. The first and second connection portions 414, 414 are configured such that movement of one of the connection portions causes corresponding movement of the other one of the connection portions, which is illustrated through the use of arrows. For example, the connection portions may support push/pull movement such that "pushing in" or "pulling out" of the first or second connection portion 412, 414 causes corresponding movement to engage to or disengage from the computing device 102 by the respective portions, further discussion of which may be found beginning in relation to FIG. 5.

In this example 400, the support structure 408 includes a lower portion 416 that is configured to support a corresponding lower edge of the computing device 102, e.g., a "bottom" of an external enclosure (e.g., housing) of the computing device 102. The first and second connection portions 412, 414 are configured to support movement to engage opposing sides of the computing device 102 by forming a U-shaped structure along with the bottom portion 416.

Each of the first and second connection portions 412, 414 in this example includes a respective connection device that is configured to engage corresponding ports of the computing device 102. Examples of this are illustrated as a USB connection device 418, a mini-display port connection device 420, and a power connection device 422. It should be readily apparent that other configurations of the connection devices are also contemplated without departing from the spirit and scope thereof.

In the side view 404, a side view of the second connection portion 414 is shown along with a base 424 of the docking apparatus 112. As illustrated, the connection portions and the support structure are angled in relation to a surface, on which, the docking apparatus 112 is to be placed against. This angle may increase viewability of the display device 110 when the computing device 102 is secured by the docking apparatus 112, e.g., "docked."

The base 424 of the docking apparatus 412 is also illustrated as including a portion 426 that includes a plurality of ports, to which, the peripheral devices 114 are to be connected, which is shown in the side and rear views 404, 406. Examples include a display port 428, a plurality of USB ports 430, and a power connection port 432. Thus, the USB connection device 418 may support a communicative coupling to a plurality of USB ports 430, the mini-display port 420 may communicatively couple a mini-display port of the computing device 102 to the display port 428 usable to connect to an external display, and so on.

Figure 5:
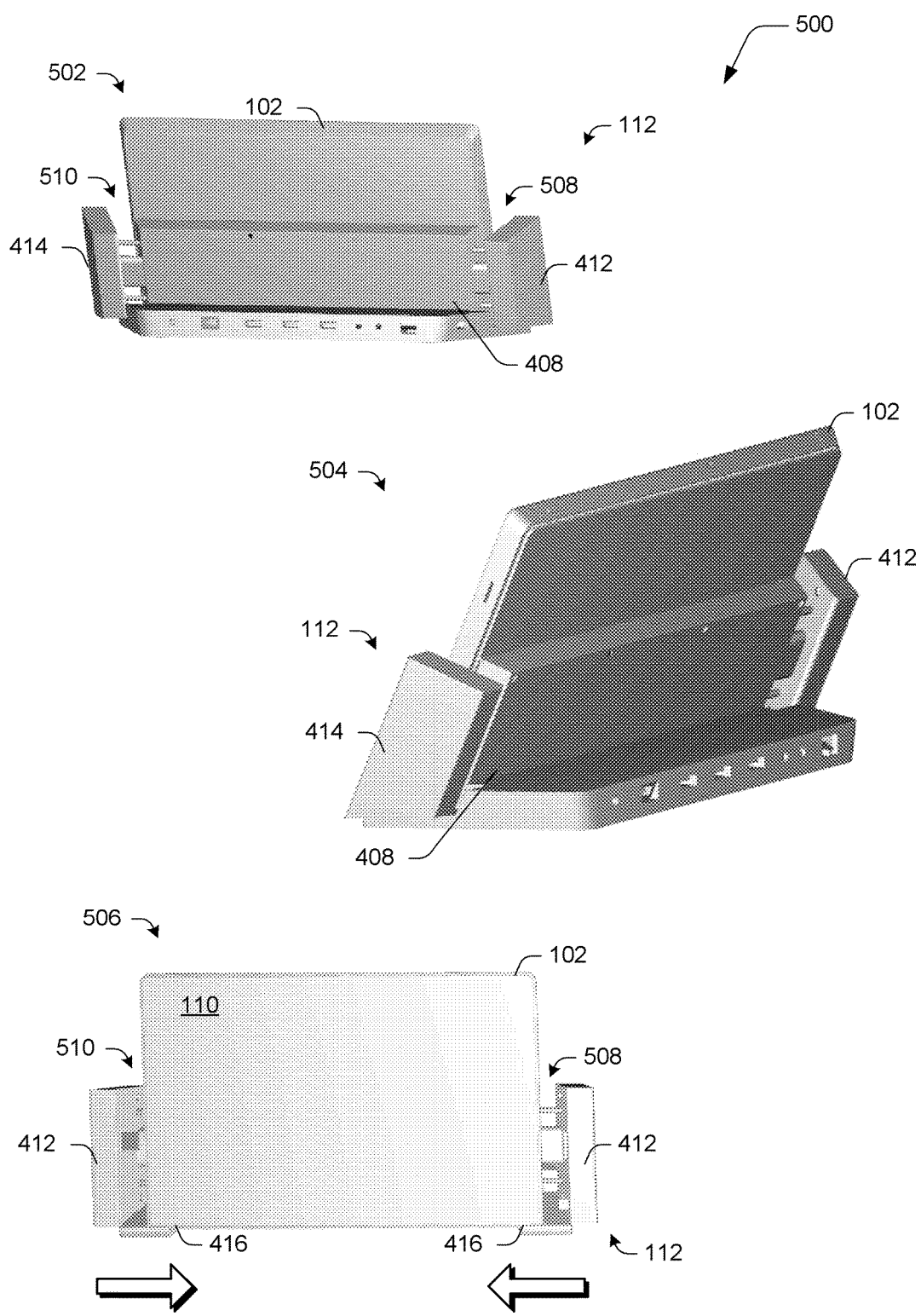
FIG. 5 depicts an example showing the computing device as positioned against a support of the docking apparatus but not engaged by the first and second connection portions.

FIG. 5 depicts an example 500 showing the computing device 102 as positioned against a support 408 of the docking apparatus 112 but not engaged by the first and second connection portions 412, 414. This example 500 is illustrated through the use of first, second, and third perspective views 502, 504, 506. The first and second connection portions 412, 414 are illustrated as including respective first and second connection mechanisms 510, 512 that support movement of the respective first and second connection portions 412, 414.

In this example 500, the movement is a sliding movement supported by sliding of connection rods and a connection support of the first and second connection mechanisms 508, 510. Other examples of movement are also contemplated, such as rotational movement supported through use of a hinge connection by the respective connection portions.

Thus, in this example a user may place the computing device 102 against the support 408 and is held by the lower portion 416. A user may then apply a force to either one of the first or second connection portions 412, 414 (illustrated through the use of arrows) to cause the connection portions, and corresponding connection devices, to engage the computing device 102. In this way, a physical and communicative coupling may be formed between the docking apparatus 112 and the computing device 102, an example of which is described as follows and shown in a corresponding figure.

Figure 6:
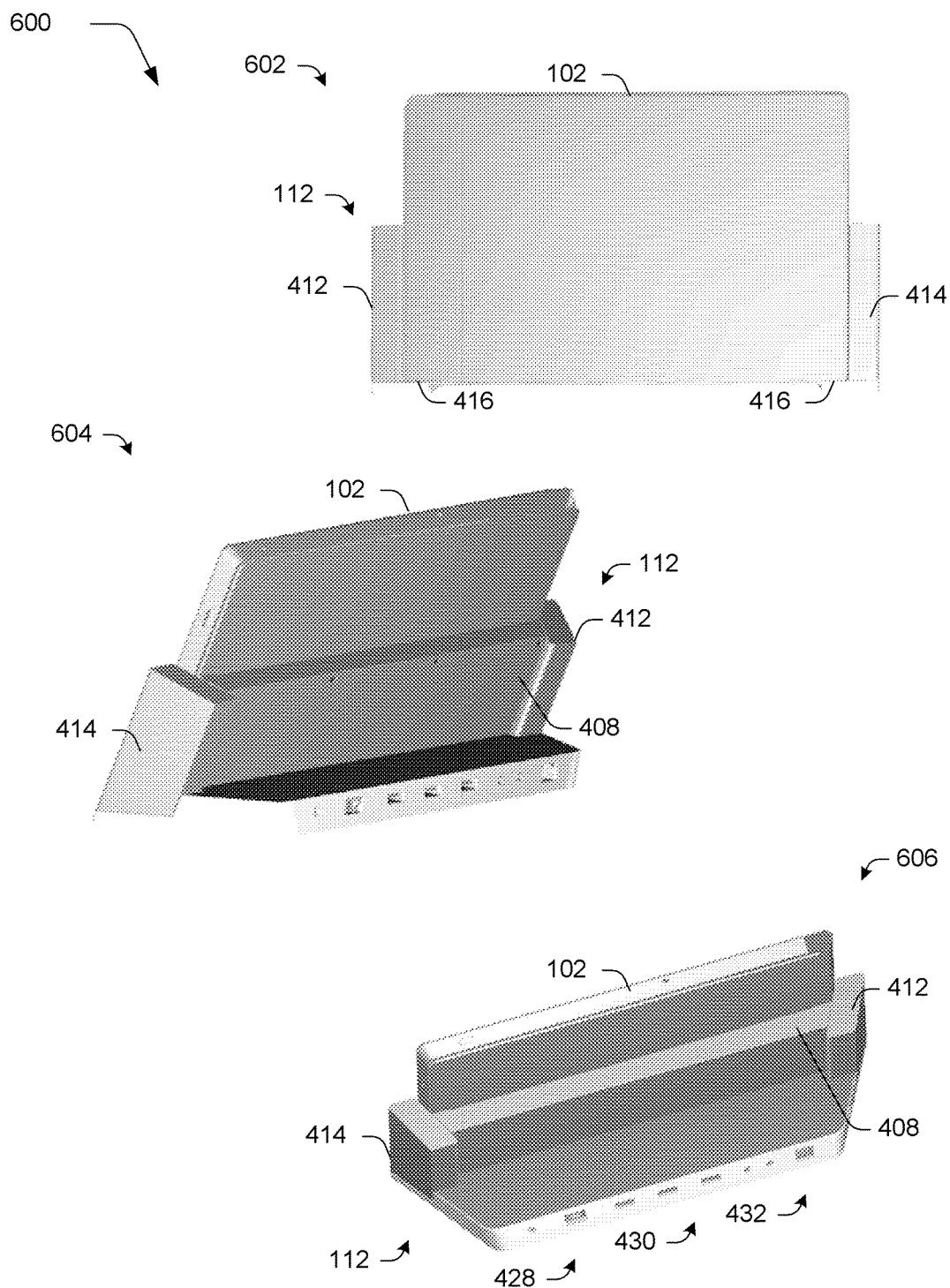
FIG. 6 depicts an example showing the computing device as positioned within and secured by first and second connection portions of the docking apparatus of FIG. 5.

FIG. 6 depicts an example 600 showing the computing device 102 as positioned within and secured by the first and second connection portions 412, 414 of the docking apparatus 112 of FIG. 5. This example 600 is also illustrated through the use of first, second, and third perspective views 602, 604, 606. In this example, however, the first and second connection portions 412, 414 have been moved to engage opposing sides of the computing device 102. Thus, the connection devices that include the USB connection device 418, display port connection device 420, and power connection device 422 of FIG. 4 have engaged corresponding ports of the computing device 102.

Accordingly, peripheral devices 114 connected to the display port 428, the plurality of USB ports 430, and the power connection port 432 of the docking apparatus 112 may be communicatively and electrically coupled to the computing device 102 that is connected to the docking apparatus 112. In this way, a plurality of peripheral devices 114 may be connected to the computing device 102 through use of the docking apparatus 112 that support "one hand operation" to connect to opposing sides of the computing device 102. It should be readily apparent that a wide variety of other configurations are also contemplated, such as a computing device 102 having ports disposed on a single side of the housing.

Figure 7:
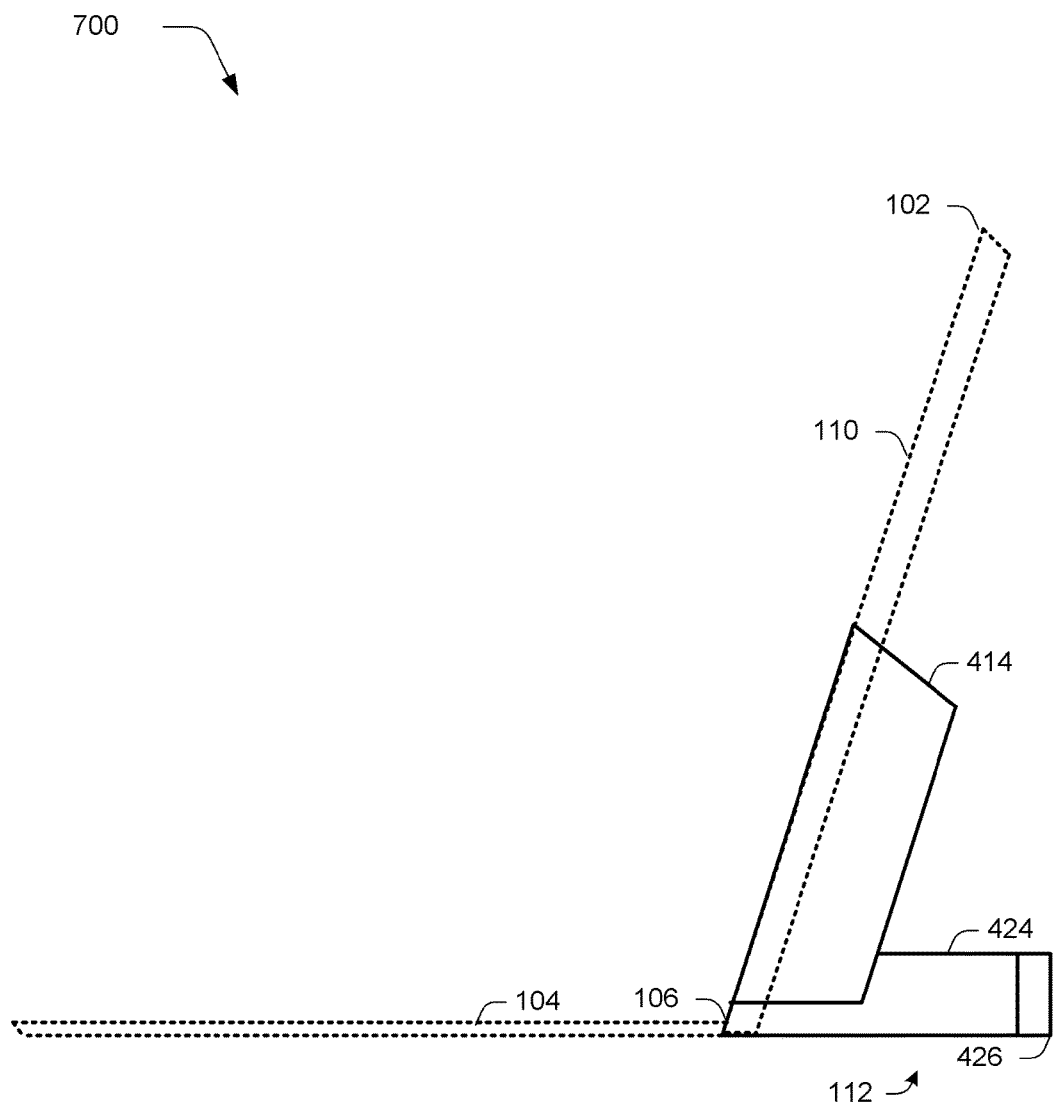
FIG. 7 depicts an example implementation of a side view of the computing device including an input device of FIG. 1 and as being secured to the docking apparatus of FIG. 4.

FIG. 7 depicts an example implementation 700 of a side view of the computing device 102 including an input device 104 of FIG. 1 and as being secured to the docking apparatus 112 of FIG. 4. As previously described, the input device 104 is movable in relation to the computing device 102 through use of a flexible hinge 106. The flexible hinge 106 permits movement of the input device 102 to cover the display device 110 of the computing device 102 (i.e., a closed configuration) and also movement to expose controls (e.g., a keyboard) of an input portion of the input device 104 as shown in phantom in FIG. 4 and shown in a front view in FIG. 1. Thus, in this example implementation 700 the docking apparatus 112 supports movement of an input device 104 connected to the computing device 102 to support interaction with the input device 104 as well as to permit the input device 104 to act as a cover for the display device 110.

Figure 8:
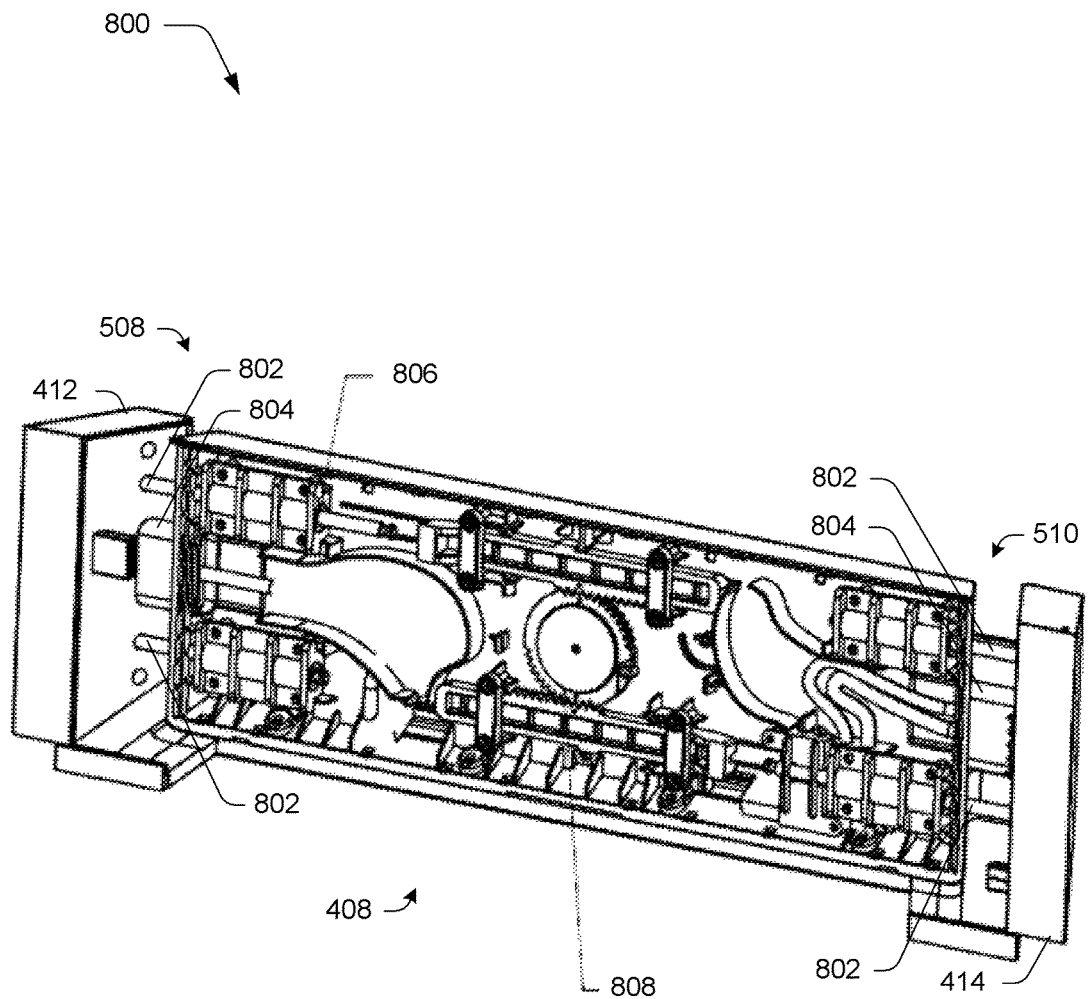
FIG. 8 depicts an example implementation in which the connection mechanisms usable to cause synchronized movement of the first and second connection portions are shown in greater detail.

FIG. 8 depicts an example implementation 800 in which the connection mechanisms 508, 510 usable to cause synchronized movement of the first and second connection portions 412 are shown in greater detail. The connection mechanisms 508, 510 each include connecting rods 802 and a connection support 804 as previously described that support sliding movement. The connecting rods are disposed within a guide bushing 806 to support precise and smooth movement of the first and second connection portions 412, 414 in relation to each other.

The support 408 includes, disposed therein, a gear and rack assembly 808 to link movement of rocker/cam ends of the connection supports 804. Therefore, movement of either one of the first or second connection portions 412, 414 toward the support 408 causes corresponding movement of the other one of the first or second connection portions 412, 414 to engage the computing device 102 as shown in FIG. 6.

Likewise, movement of either one of the first or second connection portions 412, 414 away from the support 408 causes corresponding movement of the other one of the first or second connection portions 412, 414 to disengage from the computing device 102 as shown in FIG. 5. Configuration of the rocker/cam ends of the connection supports 804 as well as the gear and rack assembly 808 may be utilized to magnify and/or reduce forces applied by movement of the first and second connection portions 412, 414 to adjust insertion and/or removal forces to engage to or disengage from the computing device 102 as desired.

Figure 9:
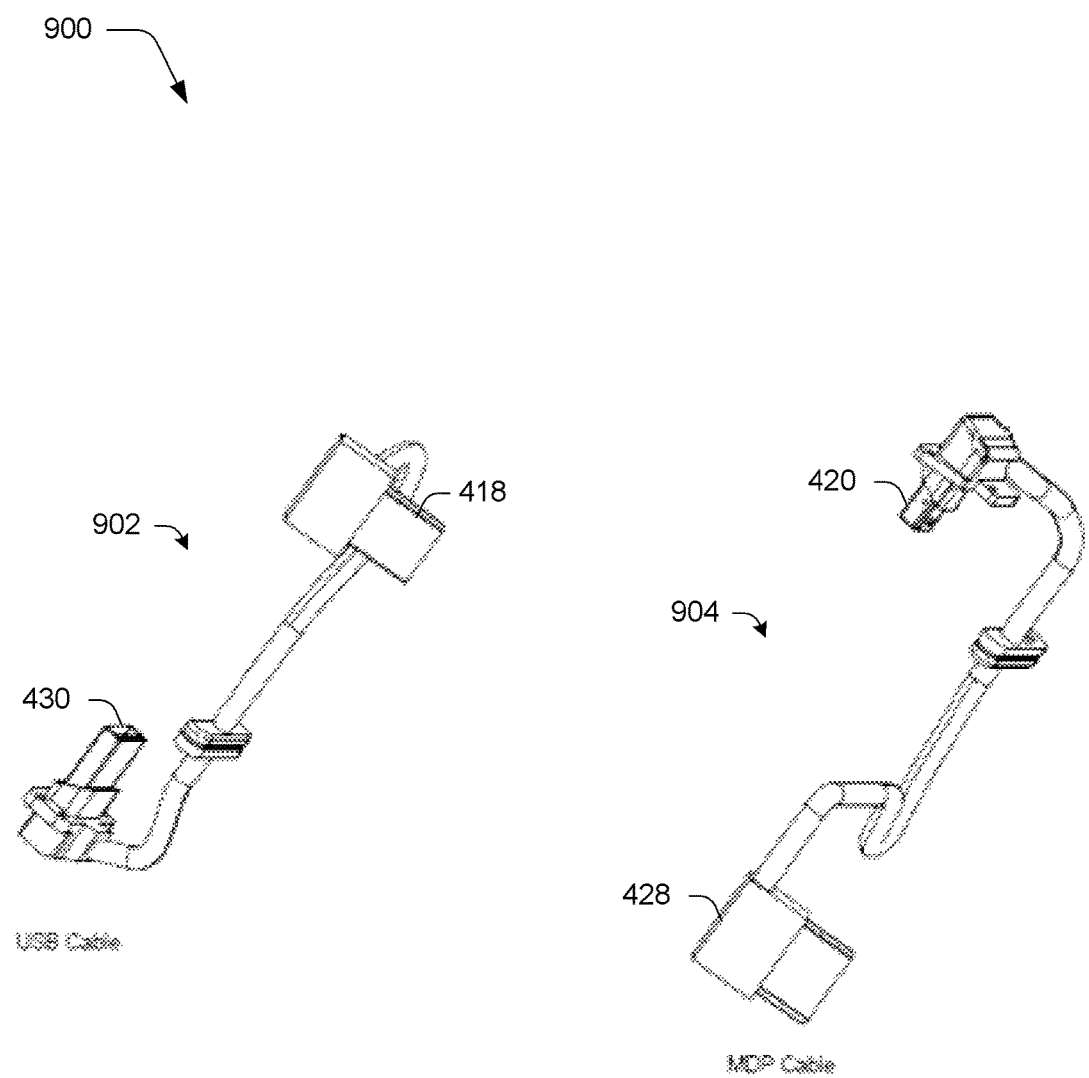
FIG. 9 depicts an example implementation showing cables used to connect connection devices to ports of the docking assembly of FIG. 4.

FIG. 9 depicts an example implementation 900 showing cables used to connect connection devices to ports of the docking assembly 112 of FIG. 4. In this example, a cable 902 is shown that is configured to couple a USB connection device 418 that is configured to engage a port of a computing device 102 to USB port 430 that is configured to provide a connection to a USB peripheral device. Cable 904 is shown that is configured to connect a mini-display port connection device 420 that is configured to engage a mini-display port of the computing device 102 to a display port 428 that is configured to connect to an external display device.

Intermediate portions of the cables 902, 904 (e.g., between the "ends" of the cables) may be configured to pass through the connection supports 804 to respective first and second connection devices 412, 414. In this way, the cables may be "hidden" within a housing of the docking apparatus 112 that includes the first and second connection portions 412, 414, connection supports 804, and support 408. Further discussion of examples of components of the housing apparatus are discussed as follows and shown in a corresponding figure.

Figure 10:
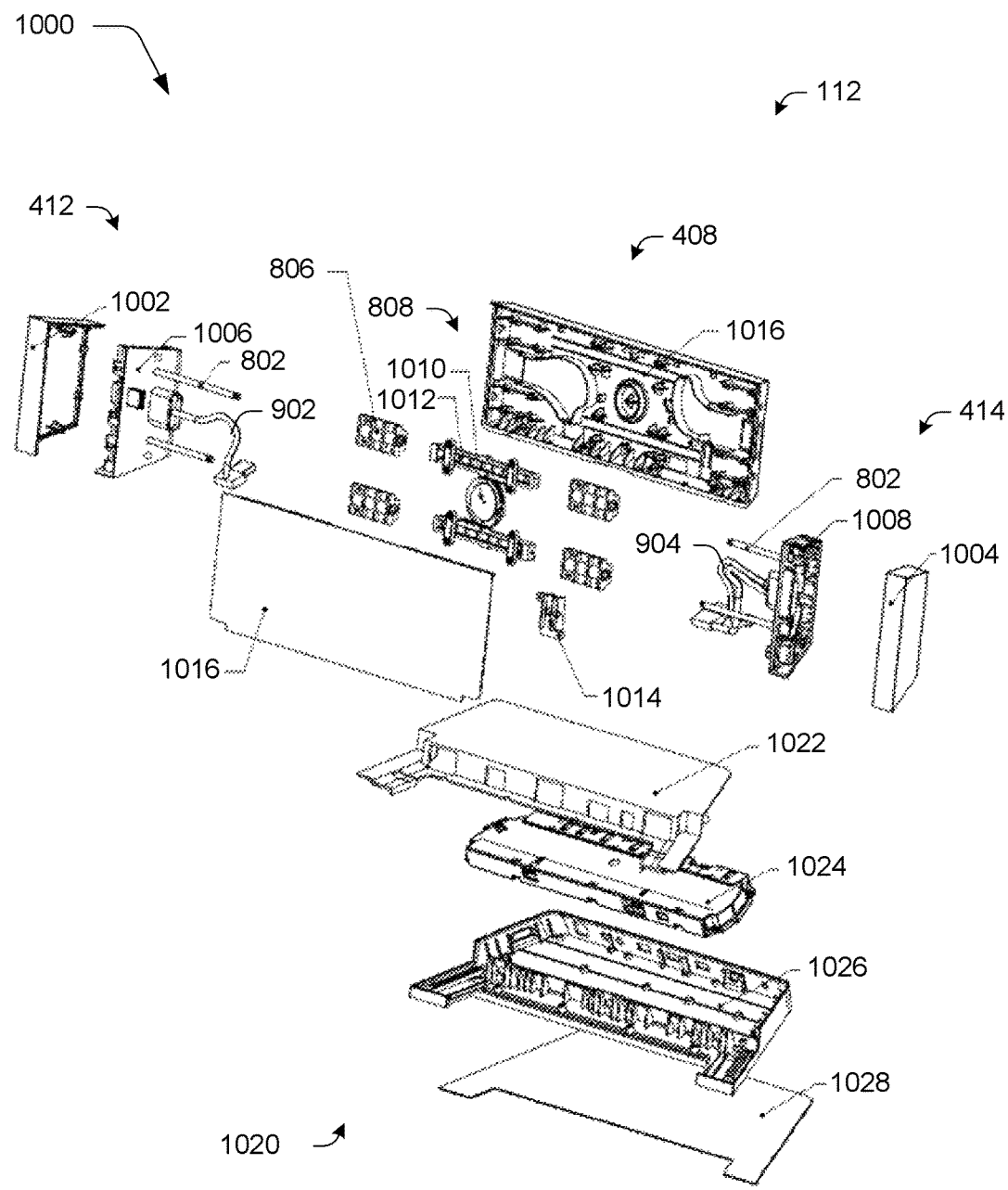
FIG. 10 depicts an example implementation showing an exploded view of the housing apparatus of FIG. 4.

FIG. 10 depicts an example implementation 1000 showing an exploded view of the housing apparatus 112 of FIG. 4. In this example, the first and second connection portions 412, 414 include covers 1002, 1004 and holders 1006, 1008. Connecting rods 802 are also illustrated that are configured for movement through a guide bushing 806.

The gear and rack assembly 808 is also shown as including a gear 1010 and a rack 1012 that is configured to link movement of the first and second connection portions 412, 414 to each other. A cable clip 1014 is also shown that may be utilized to secure the cables 902, 904 within the support 408. The support 408 is illustrated as including front and rear covers 1016, 1018 that may form an internal cavity in which the gear and rack assembly 808 and cables 902, 904 may be disposed. A base 1020 of the housing apparatus 112 is also illustrated that includes a base upper 1022, a main printed circuit board assembly (PCBA) 1024, a base bottom 1026, and a base foot 1028. Thus, the housing apparatus 112 may be configured to provide secure attachment to a computing device 102.

Manufacture of the housing apparatus 112 may also be performed to address variations in a computing device 102. For example, when installing the computing device 102 in the docking apparatus 112, the ports and connection devices are to be aligned to each other. However, different computing devices may have different ports arranged at a variety of different positions. Accordingly, a fixture may be utilized as a mockup of the computing device 102. The connection devices may then be attached to this mockup and then positioned in the respective connection portions that support movement. Accordingly, subsequent assembly of the docking apparatus 112 may cause the connection portions to remain where desired and thus prevent manufacturing variations from affecting this positioning. A variety of other examples are also contemplated without departing from the spirit and scope thereof.

Example Procedures

The following discussion describes mobile computing device dock techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-10.

FIG. 11 depicts an example procedure 1100 in which a mobile computing device is physically and communicatively coupled to a housing apparatus. A rear of a mobile computing device is positioned against a support of a docking apparatus such that a display device of the mobile computing device is viewable by a user (block 1102). As shown in FIG. 5, for instance, a rear of an external enclosure of a computing device 102 is positioned against a surface of a support 408. The computing device 102 is also held by a lower portion to prevent the computing device 102 from falling away from the docking apparatus 112. In this way, a user may position the computing device 102 using a single hand and "leave it there" to secure the device as described below.

A single one of a plurality of connection portions of the docking apparatus are moved toward the mobile computing device, the moving causing another one of the plurality of connection portions to move toward the mobile computing device such that each of the plurality of connection portions engage the mobile computing device to form a communicative coupling (block 1104). Continuing with the previous example, a user has placed the computing device 102 against the support 408. A user may then push either of the first or second connection portions 412, 414, which causes synchronized movement such that each of the first and second connection portions 412, 414 engage opposing sides of the computing device 102 as shown in FIG. 6. Thus, this action may also be performed by a single hand of a user, thereby increasing convenience and usability of the docking apparatus 112. A variety of other examples are also contemplated.

Example System and Device

Figure 12:
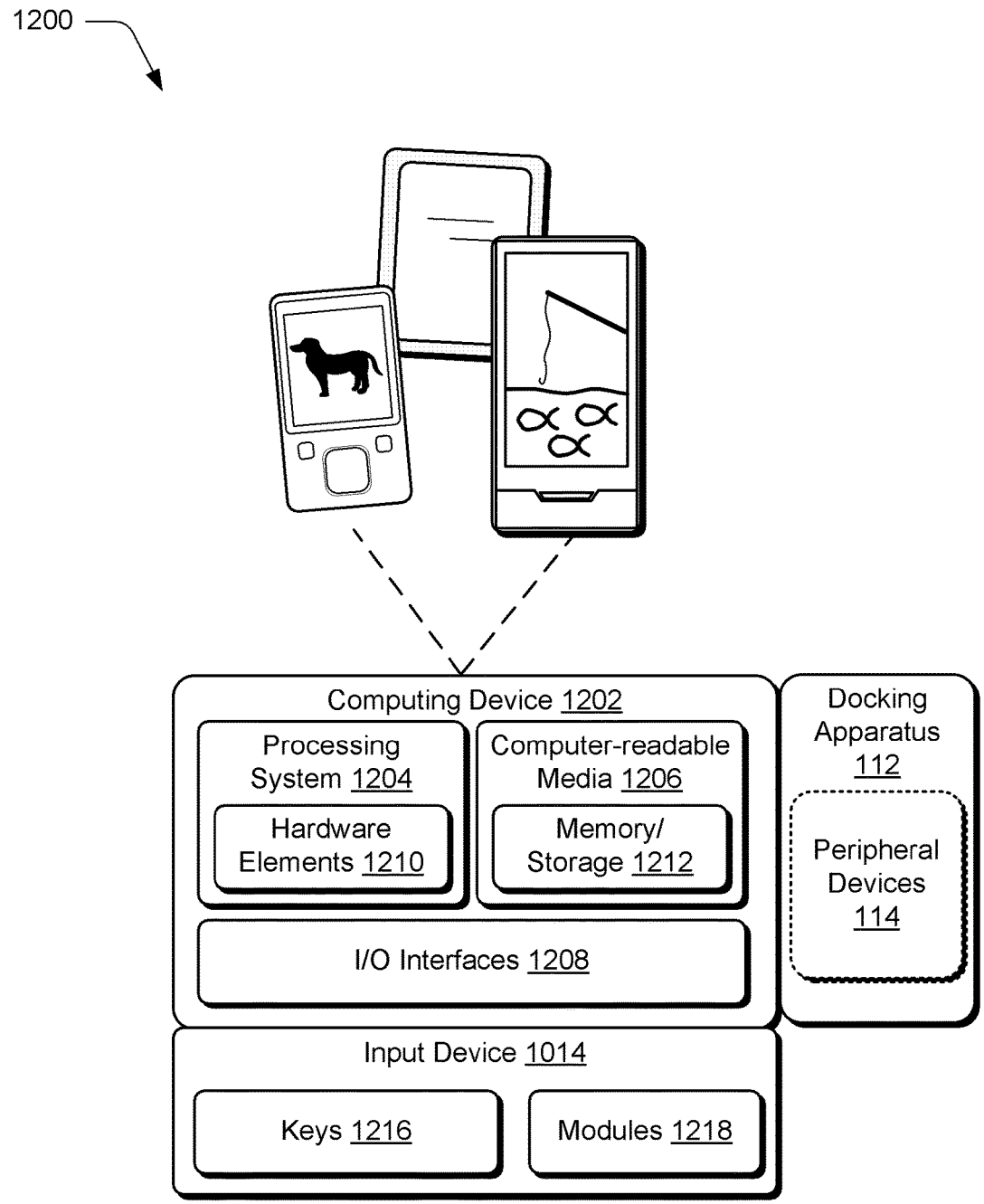
FIG. 12 illustrates an example system generally at that includes an example computing device that is representative of one or more computing systems and/or devices that may implement the various techniques described herein.

FIG. 12 illustrates an example system generally at 1200 that includes an example computing device 1202 that is representative of one or more computing systems and/or devices that may implement the various techniques described herein. The computing device 1202 may be, for example, be configured to assume a mobile configuration through use of a housing formed and size to be grasped and carried by one or more hands of a user, illustrated examples of which include a mobile phone, mobile game and music device, and tablet computer although other examples are also contemplated. Thus, the computing device 1202 may utilize a docking apparatus 112 to connect to one or more peripheral devices 114 as previously described.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways to support user interaction.

The computing device 1202 is further illustrated as being communicatively and physically coupled to an input device 1214 that is physically and communicatively removable from the computing device 1202. In this way, a variety of different input devices may be coupled to the computing device 1202 having a wide variety of configurations to support a wide variety of functionality. In this example, the input device 1214 includes one or more keys 1216, which may be configured as pressure sensitive keys, mechanically switched keys, and so forth.

The input device 1214 is further illustrated as include one or more modules 1218 that may be configured to support a variety of functionality. The one or more modules 1218, for instance, may be configured to process analog and/or digital signals received from the keys 1216 to determine whether a keystroke was intended, determine whether an input is indicative of resting pressure, support authentication of the input device 1214 for operation with the computing device 1202, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An apparatus comprising:
a base;
a support structure angled in relation to the base, the support structure configured to hold a mobile computing device; and
first and second connection portions, the first and second connection portions:
disposed on opposing sides of the support structure;
configured to form both a physical connection and a communicative connection between the mobile computing device and the apparatus; and
configured such that movement of one of the first or second connection portion causes corresponding movement of the other one of the first or second connection portion, the movement causing the first and second connection portions to physically and communicatively engage to or disengage from the mobile computing device.

2. An apparatus as described in claim 1, wherein the first and second connections portions include respective connection devices that are communicatively coupled to respective ports that are configured to support a communicative coupling to a peripheral device or power supply.

3. An apparatus as described in claim 2, wherein the respective connection devices are configured to support a universal serial bus (USB) connection or a display device connection.

4. An apparatus as described in claim 2, wherein the respective connection devices of the first and second connections portions are communicatively coupled to respective singular ports of the mobile computing device to support multiple ports disposed on the base of the apparatus.

5. An apparatus as described in claim 1, wherein the movement is a push/pull movement.

6. An apparatus as described in claim 1, wherein the movement is supported through use of a rack and gear assembly disposed within the support structure.

7. An apparatus as described in claim 6, wherein the rack and gear assembly is configured to transmit movement of connection rods that are secured to the first and second connection portions, respectively, such that movement of one of the first or second connection portions causes corresponding movement of the other one of the first or second connection portions.

8. An apparatus as described in claim 1, wherein the first and second connection portions provide horizontal alignment of the portions, one to another, when securing the mobile computing device.

9. An apparatus as described in claim 1, further comprising an opening that is configured to permit attachment and movement of a cover that is physically coupled to the mobile computing device, the cover configured to cover a display device of the mobile computing device and expose the display device of the mobile computing device.

10. An apparatus as described in claim 9, wherein:
the cover includes an input portion configured to receive inputs that are to be communicated through a communicative coupling between the input portion and the mobile computing device; and
the input portion is exposed for manipulation by one or more hands of a user when exposing the mobile computing device when secured by the first and second connection portions.

11. An apparatus as described in claim 1, wherein the base includes one or more ports to which one or more peripheral devices can be communicatively coupled.

12. An apparatus as described in claim 1, wherein the movement involves sliding of the first and second connection portions in relation to the support structure.

13. A system comprising:
a mobile computing device configured to be held by one or more hands of a user; and
a docking apparatus having a base, a support structure, and first and second connection portions, the support structure and the first and second connection portions angled in relation to the base, the first and second connection portions configured to:
  removably engage opposing sides of the mobile computing device;
  form a communicative coupling to the mobile computing device via a respective connection device; and
  cause movement of one of the first or second connection portions corresponding to movement of the other one of the first or second connection portions.

14. A system as described in claim 13, further comprising an opening that is configured to permit attachment and movement of a cover that is physically and communicatively coupled to the mobile computing device, the cover configured to cover a display device of the mobile computing device and expose the display device of the mobile computing device and an input portion of the cover, the input portion configured to receive inputs that are to be communicated through the communicative coupling to the mobile computing device.

15. A system as described in claim 13, wherein the respective connection devices of the first and second connections portions are communicatively coupled to multiple ports on the base of the docking apparatus, each of the multiple ports configured to support a communicative coupling.

16. A system as described in claim 15, wherein the respective connection devices of the first and second connections portions are communicatively coupled to respective ports to support a variety of placement locations as part of the first and second connection portions, respectively.

17. A method comprising:
positioning a rear of a mobile computing device against a support of a docking apparatus, the support angled in relation to a base of the docking apparatus such that a display device of the mobile computing device is viewable by a user; and
moving a single one of a plurality of connection portions of the docking apparatus toward the mobile computing device, the moving causing another one of the plurality of connection portions to move toward the mobile computing device such that each of the plurality of connection portions engage the mobile computing device to form both a physical and a communicative coupling.

18. A method as described in claim 17, wherein the moving comprises a push/pull movement.

19. A method as described in claim 17, wherein the moving comprises sliding.

20. A method as described in claim 17, wherein the base of the docking apparatus comprises multiple ports communicatively coupled to the single one of the plurality of connection portions.

* * * * *